United States Patent [19]
Masuda

[11] Patent Number: 5,267,330
[45] Date of Patent: Nov. 30, 1993

[54] IMAGE PROCESSING APPARATUS

[75] Inventor: Yukio Masuda, Atsugi, Japan

[73] Assignee: Canon Kabushiki Kaisha, Tokyo, Japan

[21] Appl. No.: 632,428

[22] Filed: Dec. 24, 1990

Related U.S. Application Data

[63] Continuation of Ser. No. 512,494, Apr. 20, 1990, abandoned, which is a continuation of Ser. No. 180,698, Apr. 8, 1988, abandoned, which is a continuation of Ser. No. 743,820, Jun. 12, 1985, abandoned.

[30] Foreign Application Priority Data

| Jun. 19, 1984 | [JP] | Japan | 59-124448 |
| Jun. 19, 1984 | [JP] | Japan | 59-124449 |
| Jun. 19, 1984 | [JP] | Japan | 59-124450 |

[51] Int. Cl.⁵ .................................. G06K 9/38
[52] U.S. Cl. .................... 382/51; 358/429; 358/457; 358/466; 382/50
[58] Field of Search .................. 382/50-53, 382/56, 18, 19; 358/426, 429, 433, 455, 456, 457, 464, 462, 466, 465

[56] References Cited

U.S. PATENT DOCUMENTS

| 3,496,543 | 2/1970 | Greenly | 382/9 |
| 4,225,885 | 9/1980 | Lux et al. | 382/51 |
| 4,251,837 | 2/1981 | Janeway, III | 382/50 |
| 4,414,581 | 11/1983 | Kato et al. | 358/280 |
| 4,503,556 | 3/1985 | Scherl et al. | 358/462 |
| 4,509,195 | 4/1985 | Nadler | 382/51 |
| 4,517,606 | 5/1985 | Yokomizo et al. | 382/50 |
| 4,547,811 | 10/1985 | Ochi et al. | 382/53 |
| 4,577,235 | 3/1986 | Kannapell et al. | 358/282 |
| 4,606,065 | 8/1986 | Beg et al. | 382/18 |
| 4,675,909 | 6/1987 | Egami et al. | 382/18 |
| 4,709,274 | 11/1987 | Tanioka | 358/283 |
| 4,729,035 | 3/1988 | Tanioka | 358/282 |
| 5,018,024 | 5/1991 | Tanioka | 358/462 |

Primary Examiner—Joseph Mancuso
Attorney, Agent, or Firm—Fitzpatrick, Cella, Harper & Scinto

[57] ABSTRACT

An image processing apparatus comprises an image data input device and a processor for processing an image data inputted by the input device. The processor includes a binarizing circuit for binarizing the input image data, a counter for counting the binary data outputted from the binarizing circuit and a discrimination circuit for discriminating an image content in accordance with count of the counter.

33 Claims, 12 Drawing Sheets

| 50 | 50 | 55 | 55 | 60 | 60 | 55 | 55 | 50 | 50 | 55 | 55 | 60 | 60 | 180 | 180 |
|----|----|----|----|----|----|----|----|----|----|----|----|----|----|-----|-----|
| 50 | 50 | 55 | 55 | 60 | 60 | 55 | 55 | 50 | 50 | 55 | 55 | 60 | 180 | 180 | 180 |
| 50 | 50 | 55 | 55 | 60 | 60 | 55 | 55 | 50 | 50 | 55 | 55 | 180 | 180 | 180 | 180 |
| 50 | 50 | 55 | 55 | 60 | 60 | 55 | 55 | 50 | 50 | 55 | 55 | 180 | 180 | 180 | 180 |

| 99 | 115 | 131 | 147 | 107 | 123 | 139 | 155 |
|----|-----|-----|-----|-----|-----|-----|-----|
| 83 | 3   | 19  | 163 | 91  | 11  | 27  | 171 |
| 67 | 51  | 35  | 179 | 75  | 59  | 43  | 187 |
| 243| 227 | 211 | 195 | 251 | 235 | 219 | 203 |

FIG. 7

| | a | | | | b | | | | c | | | | d | | |
|---|---|---|---|---|---|---|---|---|---|---|---|---|---|---|---|
| 0 | 0 | 1 | 1 | 1 | 2 | 2 | 3 | 3 | 1 | 0 | 0 | 0 | 0 | 0 | 0 |
| 0 | 0 | 1 | 1 | 2 | 2 | 2 | 3 | 3 | 0 | 0 | 1 | 2 | 3 | 3 | 3 |
| 0 | 1 | 1 | 2 | 2 | 2 | 3 | 3 | 3 | 0 | 0 | 2 | 11 | 12 | 12 | 13 |
| 0 | 1 | 1 | 2 | 2 | 3 | 3 | 3 | 4 | 1 | 0 | 2 | 12 | 7 | 6 | 2 |
| 1 | 1 | 2 | 2 | 2 | 3 | 3 | 3 | 4 | 1 | 0 | 3 | 12 | 2 | 0 | 0 |
| 1 | 1 | 2 | 2 | 2 | 3 | 3 | 4 | 4 | 1 | 0 | 2 | 12 | 2 | 0 | 0 |
| 1 | 2 | 2 | 2 | 3 | 3 | 4 | 4 | 4 | 1 | 0 | 3 | 12 | 2 | 0 | 0 |
| 1 | 2 | 2 | 3 | 4 | 4 | 4 | 4 | 4 | 0 | 0 | 3 | 13 | 2 | 0 | 0 |

| | a | | | | b | | | | c | | | | d | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | B | B | B | B |
| 0 | 0 | 0 | 0 | 0 | 0 | 0 | 0 | 0 | 0 | 0 | 0 | B | B | B | 0 |
| 0 | 0 | 0 | 0 | 0 | 0 | 0 | 0 | 0 | 0 | 0 | 0 | B | 0 | 0 | 0 |
| 0 | 0 | 0 | 0 | 0 | 0 | 0 | 0 | 0 | 0 | 0 | 0 | B | 0 | 0 | 0 |
| 0 | 0 | 0 | 0 | 0 | 0 | 0 | 0 | 0 | 0 | 0 | 0 | B | 0 | 0 | 0 |
| 0 | 0 | 0 | 0 | 0 | 0 | 0 | 0 | 0 | 0 | 0 | 0 | B | 0 | 0 | 0 | e f g h

FIG. 9

| | a | | | | b | | | | c | | | | d | | |
|---|---|---|---|---|---|---|---|---|---|---|---|---|---|---|---|
| 0 | 0 | 0 | 0 | B | 0 | 0 | 0 | B | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | B | 0 | 0 | 0 | 0 | 0 | B | B | B | B |
| 0 | 0 | 0 | 0 | 0 | 0 | 0 | 0 | 0 | 0 | 0 | 0 | 0 | 0 | 0 | 0 |
| B | 0 | 0 | 0 | B | 0 | B | 0 | B | 0 | 0 | 0 | B | 0 | 0 | 0 |
| 0 | 0 | 0 | 0 | 0 | 0 | 0 | 0 | 0 | 0 | 0 | 0 | 0 | 0 | 0 | 0 |
| 0 | 0 | B | 0 | 0 | 0 | B | 0 | B | 0 | 0 | 0 | B | 0 | 0 | 0 |
| 0 | 0 | 0 | 0 | 0 | 0 | 0 | 0 | 0 | 0 | 0 | 0 | 0 | 0 | 0 | 0 | e f g h

FIG. 10

| 1 | 9 | 3 | 11 |
|---|---|---|----|
| 13 | 5 | 15 | 7 |
| 4 | 12 | 2 | 10 |
| 16 | 8 | 14 | 6 |

FIG. 11

| a | b | c | d |
|---|---|---|---|
| 16 | 16 | 16 | 9 |
| 16 | 16 | 16 | 12 | e f g h

FIG. 12

| a | b | c | d |
|---|---|---|---|
| H | H | H | N |
| H | H | H | N | e f g h

FIG. 13

| 0 | 0 | 0 | 0 | B | 0 | 0 | 0 | B | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | B | 0 | 0 | 0 | 0 | 0 | B | B | B | B |
| 0 | 0 | 0 | 0 | 0 | 0 | 0 | 0 | 0 | 0 | 0 | 0 | B | B | B | 0 |
| B | 0 | 0 | 0 | B | 0 | B | 0 | B | 0 | 0 | 0 | B | 0 | 0 | 0 |
| 0 | 0 | 0 | 0 | 0 | 0 | 0 | 0 | 0 | 0 | 0 | 0 | B | 0 | 0 | 0 |
| 0 | 0 | B | 0 | 0 | 0 | B | 0 | B | 0 | 0 | 0 | B | 0 | 0 | 0 |
| 0 | 0 | 0 | 0 | 0 | 0 | 0 | 0 | 0 | 0 | 0 | 0 | B | 0 | 0 | 0 | e f g h

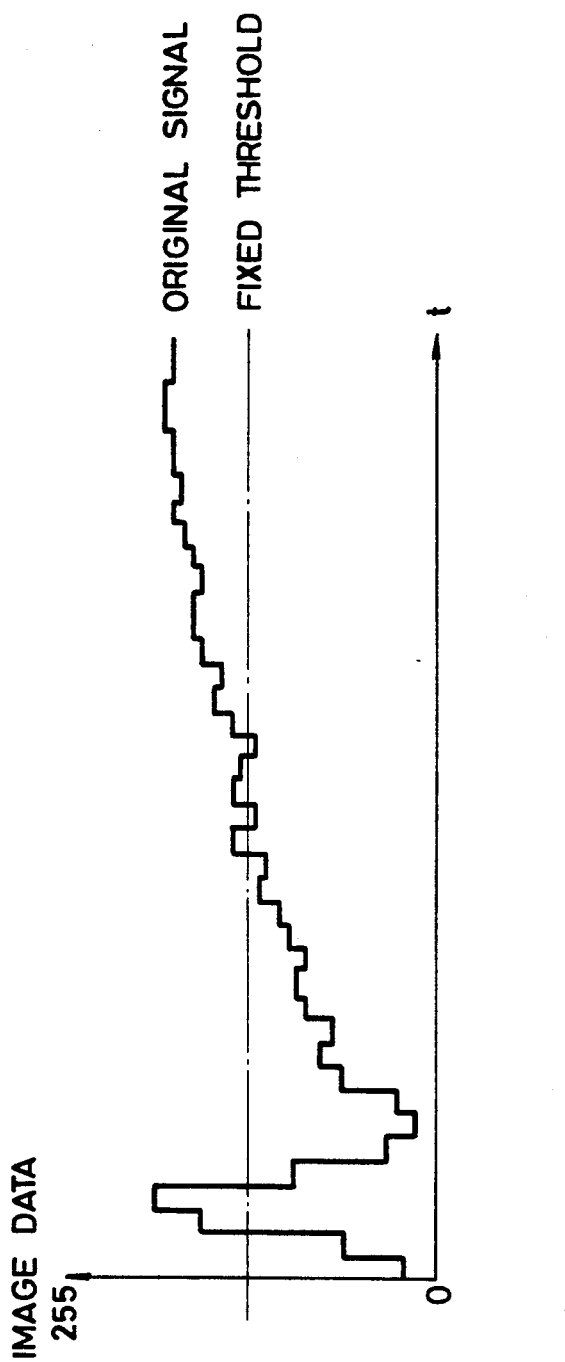
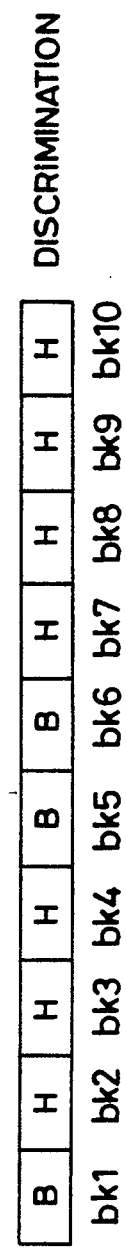
FIG. 14A
FIG. 14B
FIG. 14C

FIG. 17

| 99 | 115 | 131 | 147 | 107 | 123 | 139 | 155 |
|---|---|---|---|---|---|---|---|
| 83 | 3 | 19 | 163 | 91 | 11 | 27 | 171 |
| 67 | 51 | 35 | 179 | 75 | 59 | 43 | 187 |
| 243 | 227 | 211 | 195 | 251 | 235 | 219 | 203 |
| 107 | 123 | 139 | 155 | 99 | 115 | 131 | 147 |
| 91 | 11 | 27 | 171 | 83 | 3 | 19 | 163 |
| 75 | 59 | 43 | 187 | 67 | 51 | 35 | 179 |
| 251 | 235 | 219 | 203 | 243 | 227 | 211 | 195 |

FIG. 18

| 126 | 126 | 128 | 128 | 128 | 128 | 130 | 130 |
|---|---|---|---|---|---|---|---|
| 126 | 126 | 128 | 128 | 128 | 128 | 130 | 130 |
| 128 | 128 | 130 | 130 | 130 | 130 | 130 | 130 |
| 128 | 128 | 130 | 130 | 130 | 130 | 132 | 132 |
| 128 | 128 | 130 | 130 | 130 | 130 | 132 | 132 |
| 128 | 128 | 130 | 130 | 130 | 130 | 130 | 130 |
| 126 | 126 | 128 | 128 | 128 | 128 | 130 | 130 |
| 126 | 126 | 128 | 128 | 128 | 128 | 130 | 130 |

IMAGE PROCESSING APPARATUS

This application is a continuation of application Ser. No. 07/512,494, filed Apr. 20, 1990, which was a continuation of application Ser. No. 07/180,698, filed Apr. 8, 1988, which was a continuation of application Ser. No. 07/743,820, filed Jun. 12, 1985 all now abandoned.

BACKGROUND OF THE INVENTION

1. Field of the Invention

The present invention relates to an image processing apparatus suitable for electronic file, facsimile machine, reader, digital copying machine or the like.

2. Description of the Prior Art

In a gray level (half tone) processing system of a prior art image processing apparatus of this type, a systematic dither method in which an image signal level of each pixel is compared with a respective threshold level of a threshold matrix and black is detected when the image signal level is higher than the threshold level and white is detected when the image signal level is lower than the threshold level, to reproduce a gray level, has been usually utilized.

In this method, however, resolution power is much lower than that in a simple binary recording method using a fixed threshold, and image quality of a high resolution area such as character areas is degraded.

In order to resolve the above problem, a method has been proposed in Japanese Patent Application Laid-Open No. 3374/1983 in which an image is divided into a plurality of blocks and a difference between a maximum pixel density level and a minimum pixel density level in each block is used to determine whether the block is a gray level image area which requires high tonality reproduction, such as a photograph or picture, or a binary image (line image) area which requires high resolution, such as characters or line image.

In this method, however, circuits for determining the maximum density and the minimum density are complex and operation time therefor is required. In addition, a large capacity image buffer memory for storing a gray level image is required.

In the prior art image processing apparatus of this type, for the block determined to be the line image area, the original image information is binarized by a predetermined fixed threshold to produce a binary image, and for the block determined to be the gray level area, the original image information is dither-processed to produce a binary image.

FIG. 1 shows an example of original image information in which a character image having pixel values of 180 appears on the right of a gray level image having pixel values of 50 to 60. The image shown in FIG. 1 is divided into blocks each consisting of four pixels vertically and eight pixels horizontally, and each block is checked to determine whether it is a gray level area or a character area (line image area) based on the difference between the maximum density and the minimum density in the block (see Japanese Patent Application Laid-Open No. 3374/1984). Thus, the left block is determined as the gray level area (H) and the right block is determined as the character block (B), as shown in FIG. 2.

FIG. 3 shows an example of a systematic dither matrix having 32 thresholds. FIG. 4A shows an image produced by binarizing the original image of FIG. 1 by a fixed threshold 128, and FIG. 4B shows an image produced by binarizing the original image of FIG. 1 by the systematic dither matrix of FIG. 3.

In FIG. 4C, the images of FIGS. 4A and 4B are combined for each block in accordance with the decision shown in FIG. 2. Since the left block of FIG. 1 was determined to be a gray level area, the left block of FIG. 4B is selected for the left block of FIG. 4C, and since the right block of FIG. 1 was determined to be a character block, the right block of FIG. 4A is selected for the right block of FIG. 4C.

As a result of the area determination, the degradation in the character area (see black area 45 in FIG. 4B) which appeared in the systematic dither processing is significantly improved, as seen from black area 48 in FIG. 4C, but the gray level information around the characters (see area 44 in FIG. 4B) is dropped in FIG. 4C. As a result, peripheries of characters appear white and discontinuity with the background appears Thus, a very unnatural image is reproduced.

SUMMARY OF THE INVENTION

It is an object of the present invention to provide an image processing apparatus which can reproduce a high quality of image.

It is another object of the present invention to provide an image processing apparatus having an image discrimination function.

It is another object of the present invention to provide an image processing apparatus which can exactly reproduce an original image.

It is another object of the present invention to provide an inexpensive image processing apparatus which can reproduce a high quality of image.

It is another object of the present invention to provide a high speed image processing apparatus.

It is another object of the present invention to provide an image processing apparatus which can reproduce a high quality of image with a simple construction.

It is another object of the present invention to provide an image processing apparatus which can determine an image content without requiring a large capacity image buffer memory.

It is another object of the present invention to provide an image processing apparatus which minimizes an affect when a gray level area is erroneously determined as a character area or a line image area.

Other objects, features and advantages of the present invention will be apparent from the following detailed description of the embodiments taken in conjunction with the accompanying drawings and the appended claims.

BRIEF DESCRIPTION OF THE DRAWINGS

FIG. 7 shows another example of image information,
FIG. 8 shows an image produced by binarizing the image information of FIG. 6 by a fixed threshold,
FIG. 9 shows an image produced by binarizing the image information of FIG. 7 by a systematic diether method,
FIG. 10 shows, a threshold matrix used in the systematic dither method,
FIG. 11 shows counts of white pixels in blocks of FIG. 8,
FIG. 12 shows discrimination results of the blocks,
FIG. 13 shows an image produced by binarizing the image information of FIG. 7 by the apparatus of FIG. 5, FIGS. 14A to 14C illustrate an image type discrimination method in a first embodiment,
FIG. 17 shows a systematic dither threshold array,
FIG. 18 shows another example of an original image.

DETAILED DESCRIPTION OF THE PREFERRED EMBODIMENTS

The embodiments of the present invention will now be described in detail with reference to the drawings.

Figure 5:
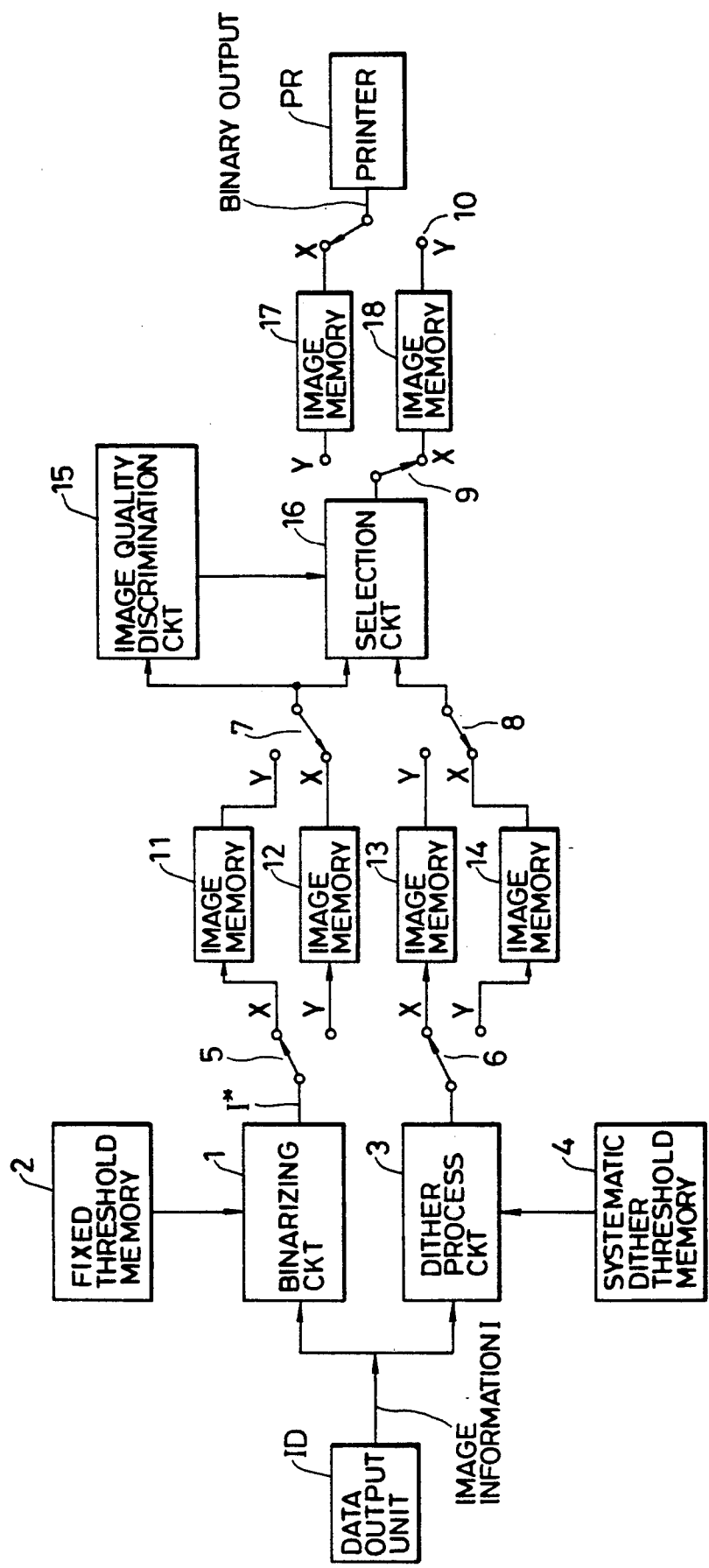
FIG. 5 is a block diagram of an embodiment of an image processing apparatus of the present invention.

FIG. 5 shows a configuration of one embodiment of the image processing apparatus of the present invention. ID denotes a data output device which outputs a digital image data of a predetermined number of bits per pixel. The data output device may have a CCD sensor for reading a document and an A/D converter for A/D-converting an analog image data of the CCD sensor. Numeral 1 denotes a fixed threshold binarizing circuit for binarizing the image information I from the data output device ID by a fixed threshold, numeral 2 denotes a memory which stores the fixed threshold therein, numeral 3 denotes a dither processing circuit for binarizing the image information I by a systematic dither processing, numeral 4 denotes a threshold memory which stores therein a threshold matrix for systematic dither processing, numerals 11 and 12 and numerals 13 and 14 denote image memories which store image information binarized by the circuits 1 and 3, respectively, that is, predetermined numbers of scan lines of image information of one bit per pixel, numeral 15 denotes an image type discrimination circuit to determine whether a block is a gray level (half tone) image area such as photograph or a binary image area (line image area) such as characters, numeral 16 denotes a selection circuit for selecting the image information binarized by the fixed threshold or the image information binarized by the dither processing in accordance with the discrimination result obtained by the image type discrimination circuit 15, numerals 17 and 18 denote output binary image memories, PR denotes a printer which prints out the image in accordance with the binary data read from the binary image memory 17 or 18, and numerals 5-10 denote switches switched to X-terminals or Y-terminals at every predetermined number of scan lines. As those switches are switched, the image information of the image memories 11-18 are written or read.

In a variation of such image processing apparatus, which uses the image information I as address information, first and second memories which store the binary data therein are provided in place of the binarizing circuit 1 and the dither processing circuit 3. The first memory stores the image information binarized by the fixed threshold and the second memory stores the image information binarized by the dither processing. The image information I is supplied to the first and second memories as address data so that corresponding binary image data are read and supplied to the image memories 11-14.

When the switches 5-10 are switched to the X-terminals as shown, the image information I read from the document is sequentially binarized by the fixed threshold binarizing circuit 1 and stored in the image memory 11. The image information I is also binarized by the dither processing circuit 3 and stored in the image memory 13. Where the document image is divided into blocks each consisting of m × n pixels, the switches 5-10 are switched from the X-terminals to the Y-terminals when the binarization of the image information I for n times of scan has been completed so that the image information I is sent from the circuits 1 and 3 to the image memories 12 and 14 and the binary image information stored in the image memories 11 and 13 is read out. In this manner, the image information can be continuously processed.

When the switches are in the positions shown in FIG. 5, the image type discrimination circuit 15 sequentially reads out the content of the image memory 12 block by block and the number of white pixels (or the number of black pixels) in each block is counted. A discrimination signal is produced in accordance with the count and it is sent to the selection circuit 16. When the count C ($0 \leq C \leq mn$) is equal or close to 0 or mn, the image type discrimination circuit 15 discriminates the block as a gray level image area, and if the count C is any other value, it discriminates the block as a binary image area. If the discrimination signal indicates a gray level image area, the selection circuit 16 transfers the content of the image memory 14 which stores the dither-processed image therein, to the output image memory 18, block by block, and if the discrimination signal indicates the binary image area, the selection circuit 16 transfers the content of the image memory 12 which stores therein the image binarized using the fixed threshold to the output image memory 18.

The image type discrimination circuit 15 may be a microcomputer having a CPU, ROM and RAM or a logic circuit. When the microcomputer is used for the image type discrimination circuit, the image type of the block is discriminated using the following procedure.

Figure 6:
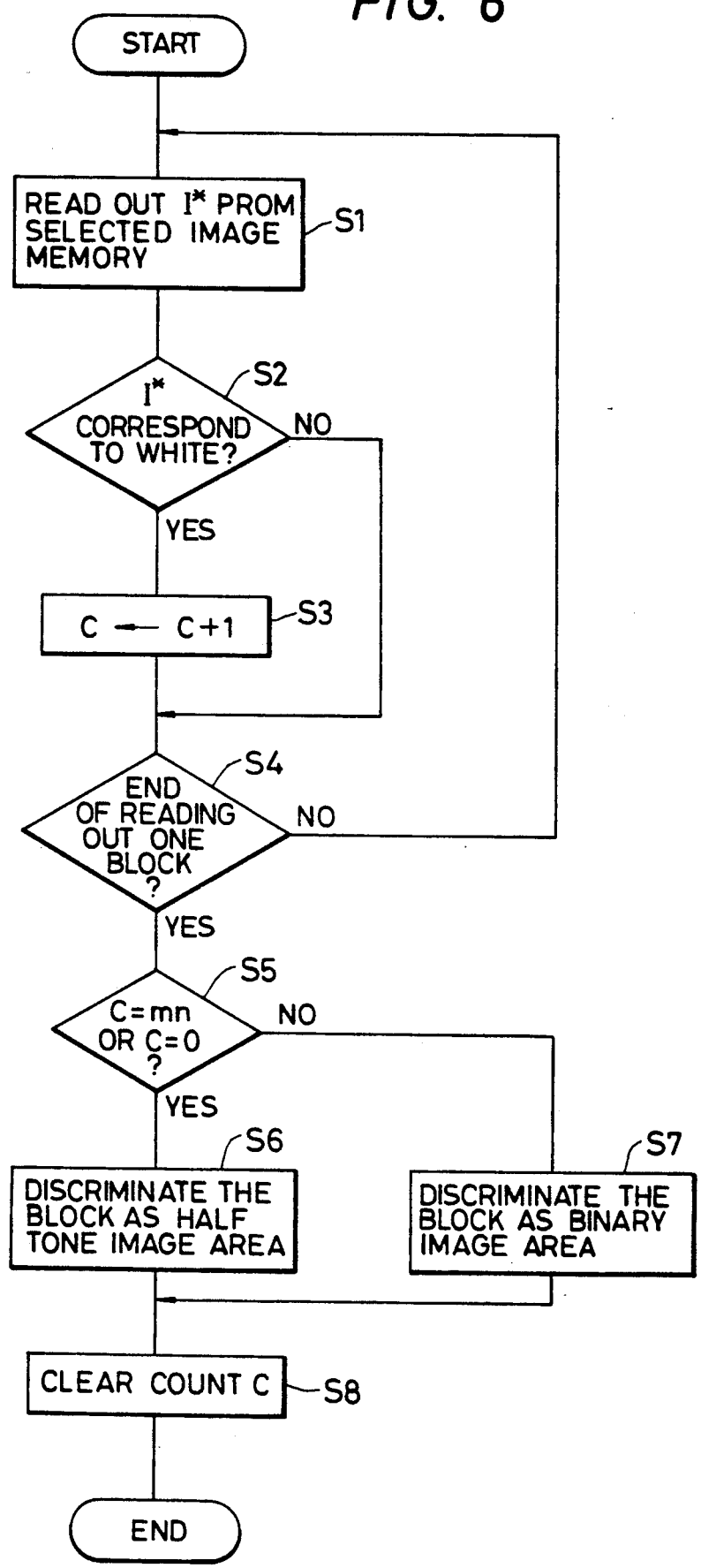
FIG. 6 is a flow chart showing an image type discrimination procedure.

In an image type discrimination procedure shown in FIG. 6, a gray level image area is discriminated identified if the number of white pixels is equal to nm. The flow chart of FIG. 6 may be programmed and stored in the ROM of the image type discrimination circuit 15. In a step S1, one-bit binary image information I* for one pixel is read from the image memory selected by the switch, and it is checked to determine whether it represents a white pixel or not. If the decision is YES, the count C is incremented by one and a step S4 is executed. If the decision is NO, the step S4 is directly executed. In the step S4, whether one block (m×n) of pixels have been read or not is checked, and if they have, a step S5 is executed.

In the step S5, whether the count C is equal to 0 or mn, or not is checked. If the decision is YES, a step S6 is executed, and if the decision is NO, a step S7 is executed, where the block is discriminated as the gray level (half-tone) image area or the binary image area, respectively, and the discrimination signal is sent to the selection circuit 16. In a step S8, the count C is cleared. Thus, the image type discrimination for one block is completed. The above process is carried out for each of the blocks.

Referring to FIGS. 7 to 13, the first embodiment is explained in more detail.

FIG. 7 shows image information read from a document M. It may be image data supplied from the data output device ID. Squares shown by broken lines represent pixels. Large squares a-h shown by solid lines represent blocks. In the present embodiment, each block consists of m×n=4×4=16 pixels.

Numerals in the pixels represent density levels read from the document M, and 0 indicates white, 16 indicates black and intermediate numerals indicate gray levels. While the numerals shown in FIG. 7 are integers, they need not be integers.

FIG. 8 shows an image pattern produced by binarizing the image information of FIG. 7 using a fixed threshold, e.g., "6". It is stored in the image memory 11 or 12. "0" represents a white pixel and "B" represents a black pixel. The pixels in the blocks a, b, c, e, f and g which are gray level areas and have small changes of density in the blocks are all represented by "0", and only those pixels which correspond to the black character areas in the blocks d and h which include characters and have large changes of density in the blocks are represented by "B". Thus, the black character areas are well reproduced.

FIG. 9 shows an image pattern produced by binarizing the image information of FIG. 7 using a Bayer threshold matrix shown in FIG. 10 in a systematic dither method and shows one-bit image data for each of the pixels stored in the image memory 13 or 14. It is seen that the black character areas in the blocks d and h are discontinuous and degraded by the dither processing.

FIG. 11 shows counts of white pixels "0" in each block obtained by the image type discrimination circuit 15 in accordance with the binary image data shown in FIG. 8. The counts for the blocks a, b, c, e, f and g are equal to 16 which is the number of pixels in the block but the counts for the blocks d and h are not equal to 16.

FIG. 12 shows a discrimination result obtained by the image type discrimination circuit 15 based on the counts of the white pixels shown in FIG. 11. For the blocks a, b, c, e, f and g having the counts of 16, the discrimination signals H representing gray level (half-tone) areas are given, and for the blocks d and h having the counts not equal to 0 or 16, discrimination signals N representing the binary image areas are given, and those discrimination signals are sent to the selection circuit 16.

FIG. 13 shows image information in the output image memories 17 and 18. The selection circuit 16 combines the binary image produced by the fixed threshold of FIG. 8 and the binary image produced by the dither processing of FIG. 9, in accordance with the discrimination signal shown in FIG. 12. When the discrimination signal for a block is N, the corresponding block in the binary image produced by the fixed threshold of FIG. 8 is transferred to the corresponding block in the output image memory, and when the discrimination signal for the block is H, the corresponding block in the binary image produced by the dither processing of FIG. 9 is transferred to the corresponding block in the output image memory.

In this manner, the present embodiment can exactly reproduce the gray level image area and the binary image area such as characters on the document.

For a gray level image area different from that shown in FIG. 7, whose pixels are closer to the black level than to the fixed threshold level, all pixels in the block are binarized to black. Thus, the number of white pixels counted in the block is zero. As a result, the block is discriminated as gray level image area.

In the present embodiment, the fixed threshold binarizing circuit simply binarizes the image information. Alternatively, an outline-emphasized image information may be binarized by the fixed threshold to improve sharpness.

In the present embodiment, the image type discrimination circuit looks at only one block, the block whose type is being discriminated discriminated. Alternatively, information of adjacent blocks may be considered in the discrimination so that a more correct discrimination is made.

In accordance with the present embodiment, the high tonality reproduction area and the high resolution area are discriminated block by block based on the number of white (or the number of black) pixels in the block. Accordingly, an image which includes a mixture of photographs and characters can be readily and rapidly reproduced without requiring a large capacity image memory.

In the present embodiment, the area having a large change of density such as a character area and the area having a small change of density such as a photograph can be simultaneously discriminated. Thus, a redundancy suppression encoding system need not be changed depending on the content of the image.

Accordingly, the present embodiment can be effectively utilized for the transmission of gray level information using a facsimile machine.

A second embodiment is now explained. In the first embodiment, a block having a density level close to the fixed threshold, which should be discriminated as the gray level block, may be misdiscriminated as a character block.

FIGS. 14A-14C illustrate the binary image block discrimination system in the first embodiment. FIG. 14A one-dimensionally shows a relation between 8-bit quantized image data and the fixed threshold (level 128), and FIG. 14B shows a signal produced by binarizing the image data using the fixed threshold level.

FIG. 14C shows the discrimination result for binary image blocks each comprising four pixels. B represents a character block and H represents a gray level block. As seen from FIG. 14C, the block bk1 is correctly discriminated as a character block but the blocks bk5 and bk6 which are gray level areas in the original signal are misdiscriminated as character blocks.

This misdiscrimination is due to the fluctuation of the gray level image data around the fixed threshold and some countermeasure is required. In the second embodiment, shown in FIG. 15, such misdiscrimination is prevented.

Figure 15:
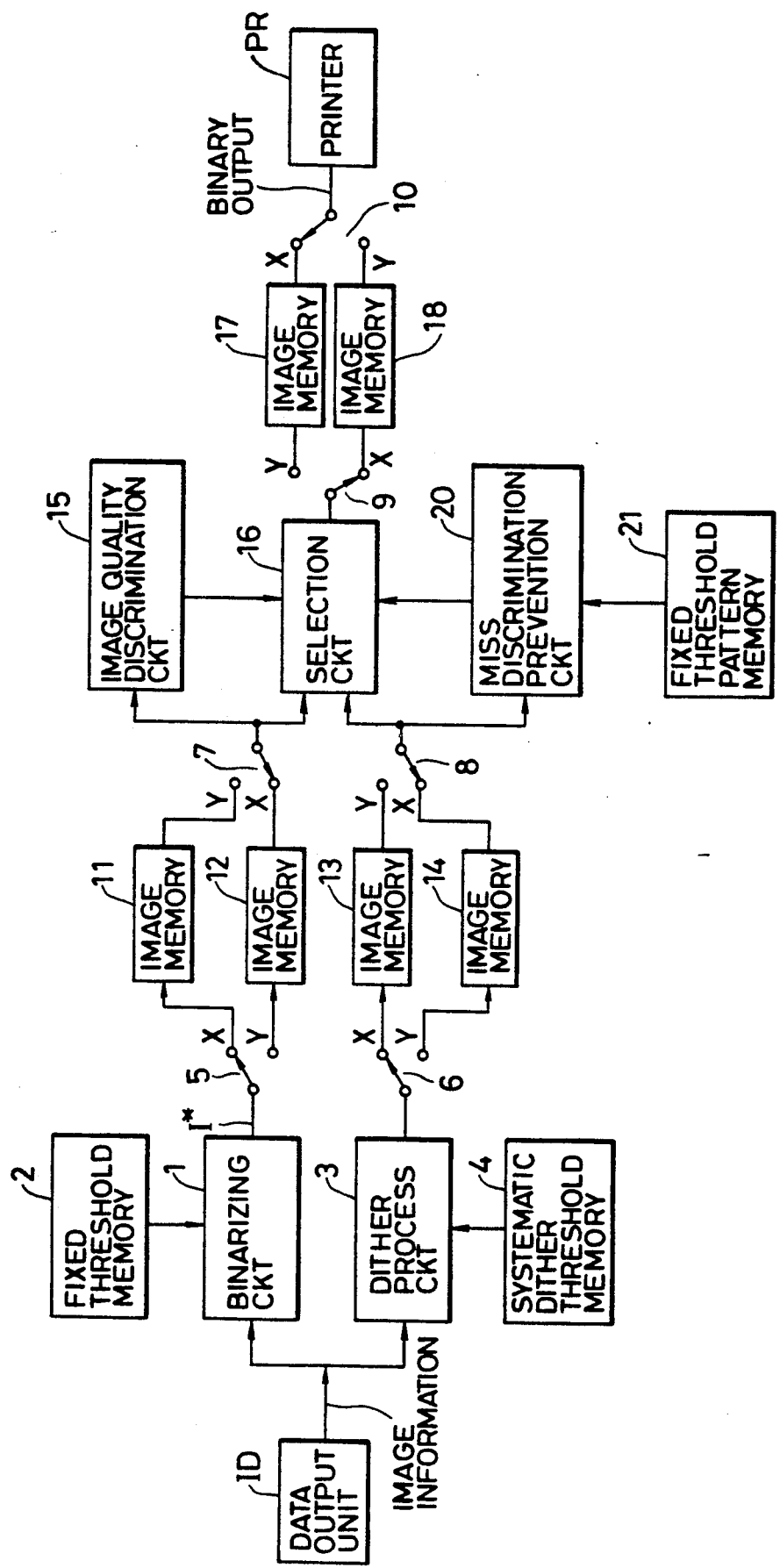
FIG. 15 shows a configuration of a second embodiment of the image processing apparatus.

FIG. 15 shows an overall configuration of the second embodiment of the image processing apparatus. Those elements having the same functions as those shown in FIG. 5 are designated by the like numerals and the explanation thereof is omitted.

A difference between FIG. 5 and FIG. 15 resides in the feature that the circuit of FIG. 15 additionally includes a misdiscrimination prevention circuit 20 and a fixed threshold pattern memory 21.

When the switches are in the positions shown in FIG. 15, the misdiscrimination prevention circuit 20 sequentially reads out the content of the image memory 14 block by block (each block comprising m×n pixels), compares each block with the content of the fixed threshold pattern memory 21, and discriminates each block as gray level image area if the degree of coincidence is high.

If the discrimination signal sent from the misdiscrimination prevention circuit 20 indicates a gray level image area, the selection circuit 16 determines the block under processing as a gray level block, and if the discrimination signal does not indicate a gray level image area, it determines the block under processing as a gray level block or character block based on the discrimination signal from the image type discrimination circuit 15.

If the block is discriminated as a gray level area, the image data from the image memory 14 is transferred to the output image memory 18, block by block, and if the block is discriminated as a character block, the image data from the image memory 12 is transferred.

The image type discrimination circuit 15 may be a microcomputer having a CPU, ROM and RAM or a logic circuit. When the microcomputer is used for the image type discrimination circuit, the flow chart shown in FIG. 6 may be used as is done in the first embodiment.

Figure 16:
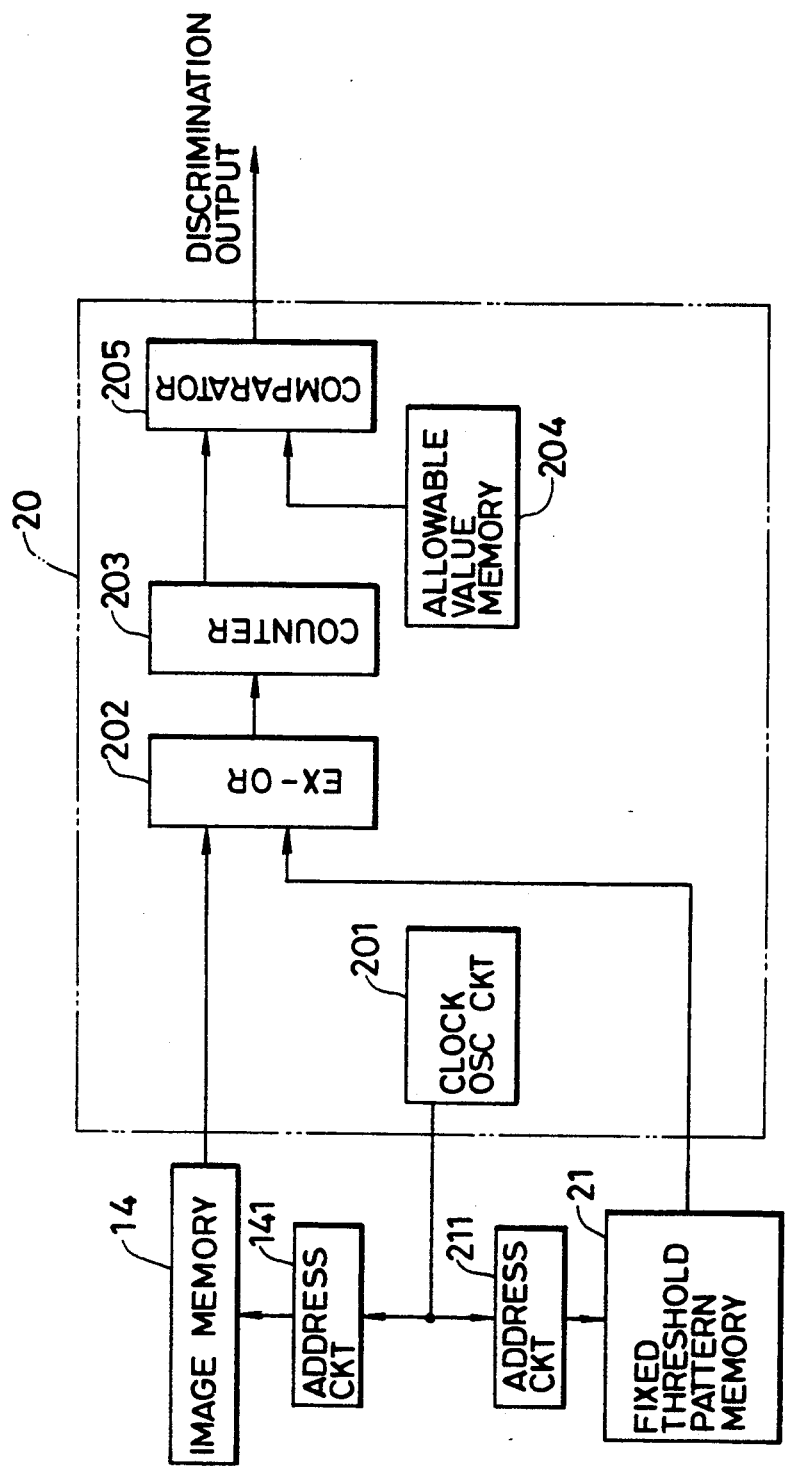
FIG. 16 shows a detail of a misdiscrimination prevention circuit.

FIG. 16 shows a detail of the misdiscrimination prevention circuit of FIG. 15. Numeral 141 denotes an addressing circuit for processing the binary data from the image memory 14 block by block, numeral 211 denotes an addressing circuit for accessing the fixed threshold pattern memory, numeral 201 denotes a clock signal generator for incrementing the addresses of the addressing circuits 141 and 211, numeral 202 denotes an exclusive OR (EX-OR) circuit for exclusively ORing one-bit outputs from the image memory 14 and the fixed threshold pattern memory 21, numeral 203 denotes a counter for counting the output of the EX-OR circuit 202, numeral 204 denotes an allowable-value memory which contains a predetermined constant, and numeral 205 denotes a computer which compares the output of the counter 203 with the output of the allowable value memory 204.

FIGS. 17 to 20 illustrate the operation of the present embodiment.

FIG. 17 shows an example of the dither threshold stored in the systematic dither threshold memory 4. It represents 33 gray levels by an 8×8 matrix. It is assumed that the original image has 8-bit pixels and 256 gray levels.

Figure 19A:
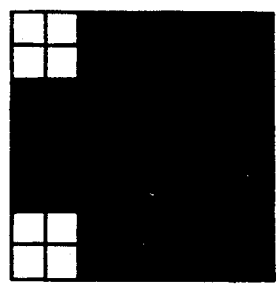
FIG. 19A shows an image produced by binarizing the image of FIG. 18 by a fixed threshold.
Figure 19B:
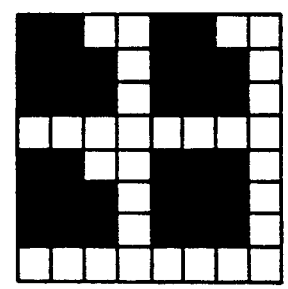
FIG. 19B shows an image produced by binarizing the image of FIG. 18 by the dither method.

FIG. 18 shows an example of the original image information. FIG. 19A shows an image pattern produced by binarizing the image shown in FIG. 18 using a fixed threshold of 128. This image pattern is stored in the image memory 12. FIG. 19B shows an image pattern produced by binarizing the image shown in FIG. 18 using the dither threshold matrix shown in FIG. 17. This image pattern is stored in the image memory 14.

Figure 20:
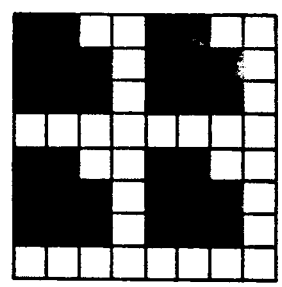
FIG. 20 shows an example of a pattern stored in a fixed threshold pattern memory.

FIG. 20 shows an example of the image stored in the fixed threshold pattern memory 21 (this is the fixed threshold of 128 binarized using the dither threshold of FIG. 17).

If the image type discrimination circuit 15 discriminates the image type for each 8×8-pixel block, an image pattern shown in FIG. 19A is produced. Since the white pixels and the black pixels are mixedly present in the block, the original image shown in FIG. 18 is misdiscriminated as a character block.

The misdiscrimination prevention circuit 20 compares the binary images of FIGS. 19B and FIG. 20, pixel by pixel (a total of sixty-four comparisons), and the number of anticoincidence is counted by a counter 203. In the present example, the count is 1. The allowable value memory 204 contains "4", for example. Since the count "1" is smaller than the allowable value, the image shown in FIG. 19B is discriminated as a gray level image close to the threshold. Thus, the selection circuit 16 selects the discrimination output of the misdiscrimination prevention circuit 20 and the image shown in FIG. 19B is transferred to the output image memory 18.

In the above misdiscrimination prevention circuit, the size of the block to be discriminated is equal to the size of the dither matrix. Depending on the arrangement of the dither thresholds, the size of the block to be discriminated may be smaller than the dither matrix. For example, since the dither threshold matrix shown in FIG. 17 is an 8×8 matrix comprising four 4×4 matrices, the dither-processed image (see FIG. 19B) is similar to the original image and comprises 4×4 matrices.

Accordingly, the size of block to be discriminated may be 4×4 size or horizontally elongated 4×8 size. In this manner, the image memory capacity is reduced and the cost of the apparatus is reduced.

Instead of the binarizing circuit 1 and the dither circuit 3, a memory which contains binary data may be provided. The image information may be directly supplied to a ROM as an address so that the dither-processed binary data is read from the ROM or data binarized using the fixed threshold is read out.

In accordance with the present embodiment, by addition of the misdiscrimination prevention circuit of simple construction, the gray level image area and the character image area can be exactly discriminated and the image quality is significantly improved.

A third embodiment of the present invention is now explained.

Figure 21:
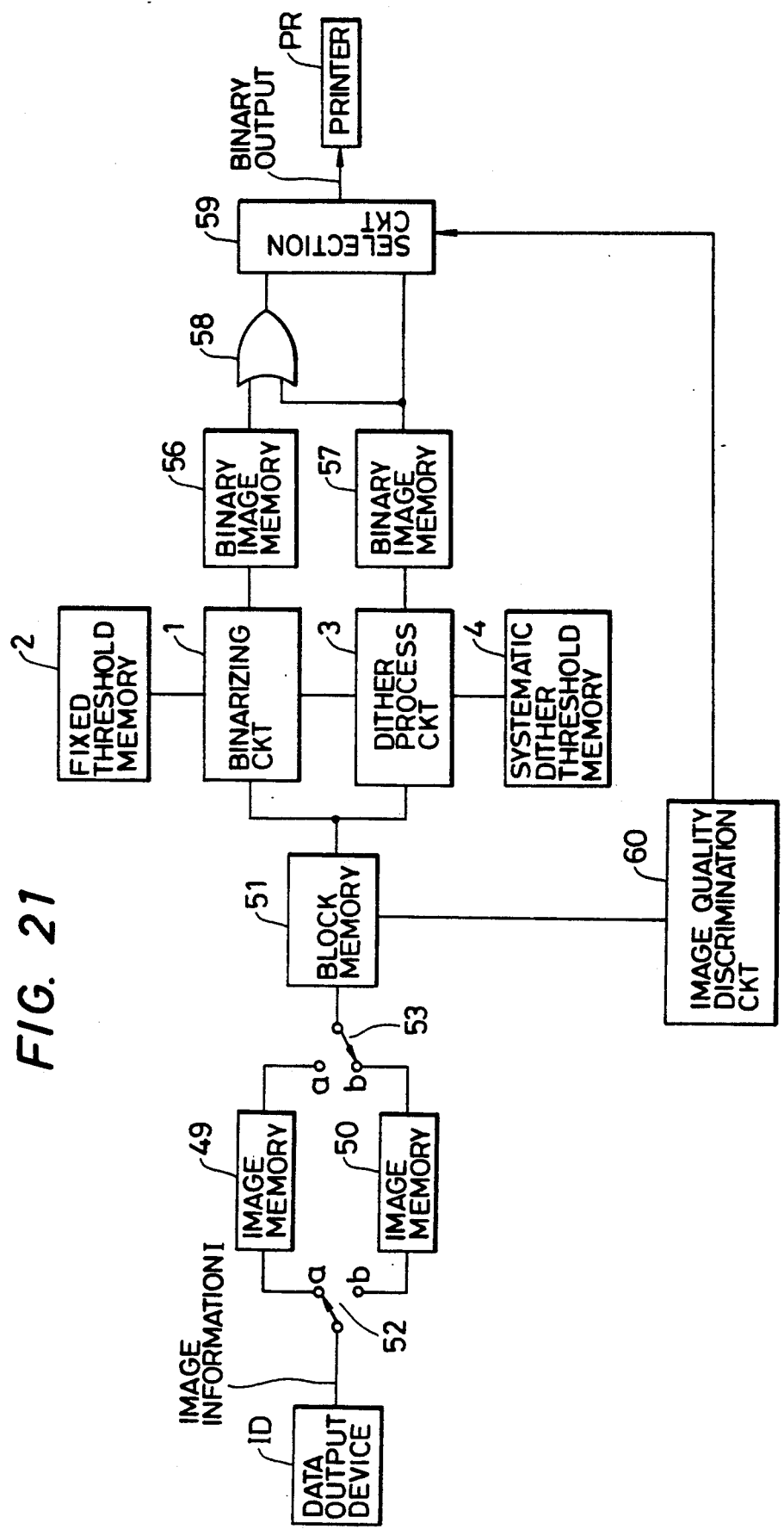
FIG. 21 shows a configuration of a third embodiment of the image processing apparatus.

FIG. 21 shows an overall configuration of the third embodiment of the image processing apparatus. Those elements which have the same functions as those shown in FIG. 5 are designated by the same numerals. Numerals 49 and 50 denote image memories which store therein image information of a predetermined number of bits per pixel, numeral 51 denotes a block memory connected to the image memories 49 and 50 for reading in the image information of the block under processing, numeral 2 denotes a memory which contains a fixed threshold, numeral 1 denotes a fixed threshold binarizing circuit for binarizing the image information of the block memory 51 using the threshold stored in the memory 2, numeral 4 denotes a memory which contains thresholds of a systematic dither matrix, numeral 3 denotes a circuit for dither-processing the image information of the block memory 51 in accordance with the content of the memory 4, numerals 56 and 57 denote memories for storing the binary images, numeral 58 denotes a logical OR circuit, numeral 59 denotes a selection circuit for selecting the output of the logical OR circuit 58 or the output of the binary image memory 57 in accordance with the discrimination signal from the image type (or image quality) discrimination circuit 60, which discriminates between gray level image area and line image area such as character area in accordance with the content of the block memory 51, and numerals 52 and 53 denote switches.

When the switches 52 and 53 are in the positions shown in FIG. 21, the image information read from the document is stored into the image memory 49. When one block consists of 4×8=32 pixels, the switch 52 is switched from terminal a to terminal b and the switch 53 is switched from terminal b to terminal a when four scan lines of image information have been stored. In this manner, continuous input and continuous processing are allowed.

The contents of the image memories 49 and 50 are transferred to the block memory 51 block by block The image information in the block memory 51 is binarized by the fixed threshold binarizing circuit 1 using the threshold stored in the fixed threshold memory 12, and the binarized image is stored in the binary image memory 56. The image information in the block memory 51 is also dither-processed by the dither processing circuit 3, and the processed image is stored in the binary image memory 57.

The image type discrimination circuit 60 discriminates whether the block undergoing processing is gray level area or line image area such as characters based on the image information in the block memory 11 and sends the discrimination signal to the selection circuit 59. When the discrimination signal indicates a gray level area, the selection circuit 59 selects the binary image stored in the binary image memory 57, and when the discrimination signal indicates a line image area such as character area, the binary images stored in the binary image memories 56 and 57 are logically ORed by the OR circuit 58 and the output signal of the OR circuit 58 is selected by the selection circuit 59.

Figures 1, 2, 3:
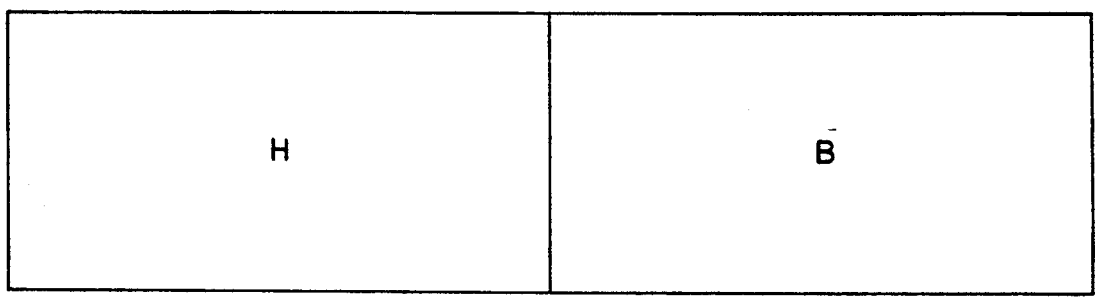
FIG. 1 shows an example of image information.
FIG. 2 shows a result of image type discrimination.
FIG. 3 shows a threshold matrix in a dither method.

When the image information shown in FIG. 1 is applied to the embodiment of FIG. 21, the image information is first stored in the image memory 49 or 50. If the block undergoing processing is a 4×8 matrix, the image information in the left block of FIG. 1 is transferred to the block memory 51.

Assuming that the fixed threshold memory 2 contains the threshold of 128, the image information of the block memory 51 is binarized by the fixed threshold binarizing circuit 1 and the binarized data is stored in the binary image memory 56. In the present example, the content of the binary image memory 56 is the image shown in the left block in FIG. 4A.

Assuming that the systematic dither threshold memory 4 contains the dither thresholds shown in FIG. 3, the image information in the block memory 51 is dither-processed by the systematic dither processing circuit 3 and the processed data is stored in the binary image memory 57. The content of the binary image memory 57 is the image shown in the left block in FIG. 4B.

In parallel to the binarization, the image type discrimination circuit 20 discriminates the image type in accordance with the content of the block memory 51 and determines that it is a gray level area as shown in the left block of FIG. 2, and sends the signal to the selection circuit 59. In response to the discrimination signal indicating the gray level area, the selection circuit 59 sends the content of the binary image memory 57 to the printer PR.

Figure 4A:
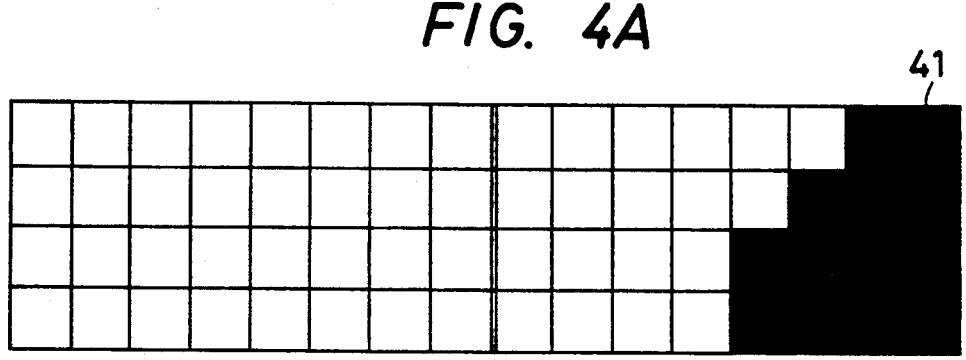
FIG. 4A shows an image produced by binarizing the image information of FIG. 1 by a fixed threshold of 128.
Figure 4B:
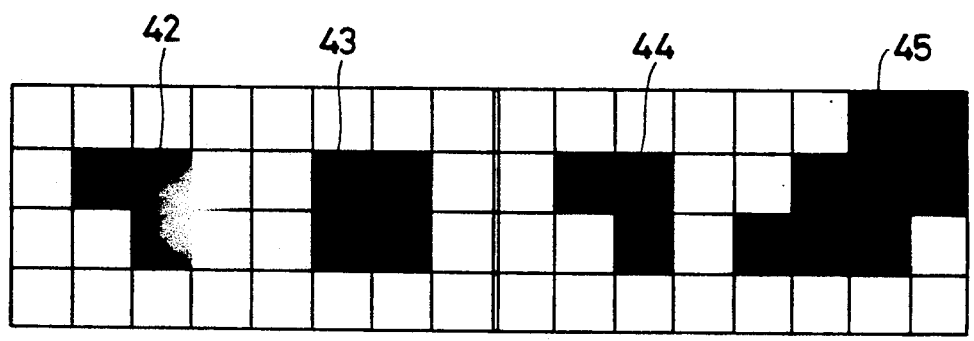
FIG. 4B shows an image produced by binarizing the image information of FIG. 1 by the threshold matrix shown in FIG. 3.
Figure 4C:
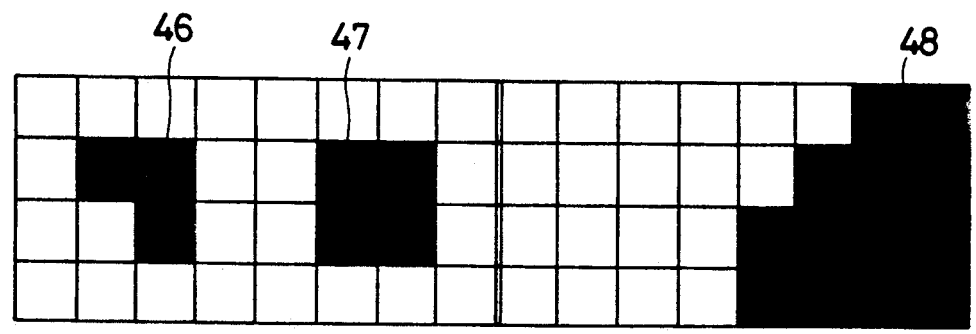
FIG. 4C shows an image reproduced by a prior art method.

Then, the right block of FIG. 1 is processed. The block memory 51 reads the image in the right block of FIG. 1 from the image memory 49 or 50 and the above process is repeated. For the right block, the binary image in the right block of FIG. 4A is stored in the binary image memory 56, and the binary image in the right block of FIG. 4B is stored in the binary image memory 57. The image type discrimination circuit 60 sends the discrimination signal for the character area to the selection circuit 59 as shown in the right block of FIG. 2.

In response to the discrimination signal for the character area, the selection circuit 59 selects the output of the logical OR circuit 58.

Figure 22:
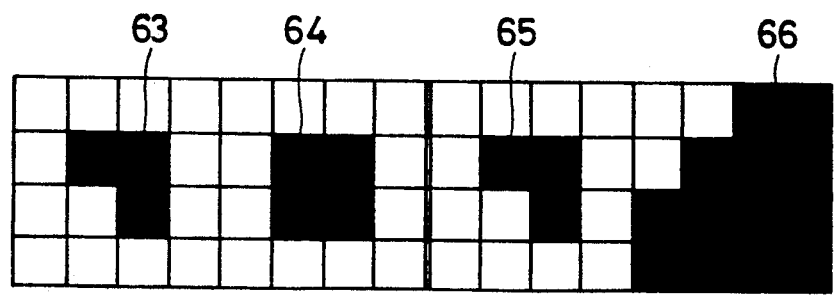
FIG. 22 shows an image reproduced in the third embodiment.

FIG. 22 shows a processed result of the image information shown in FIG. 1. As a result of processing by the present embodiment, the block area 65 representing the gray level information appears in the right block and the whitening of the periphery of the character area 66 is prevented. Thus, the image quality is highly improved.

The image type discrimination circuit 60 may be a microcomputer including a CPU, ROM and RAM, or a logic circuit.

In the present embodiment, the image type is discriminated based on the image information stored in the block memory 51. Alternatively, the image type may be discriminated using an algorithm for the binary data stored in the binary image memories 56 and 57. For example, the image type may be discriminated using a flow chart shown in FIG. 6.

Memories containing binary data may be provided in place of the binarizing circuit 1 and the dither processing circuit 3. The image information may be directly supplied to the ROM as an address so that the dither-processed binary data is read from the ROM or the data binarized by the fixed threshold is read out.

In accordance with the present embodiment, for the block discriminated as line image area such as character area, the image data binarized by the fixed threshold method and the image data binarized by the systematic dither method are logically ORed to prevent the periphery of the character from being whitened and keep continuity with the gray level area. Thus, the image quality is highly improved.

In the present embodiment, even if a gray level area is misdiscriminated as a line image area, the degradation of the image quality due to the misdiscrimination is significantly prevented because of the logical OR function with the binary image produced by the systematic dither method.

The present invention is not restricted to the illustrated embodiments but various modifications may be made within the scope of the claims.

What is claimed is:

1. An image processing apparatus comprising:
    image data input means for successively inputting image data; and
    processing means for processing image data input by said input means,
    said processing means further comprising binarizing means for binarizing the input image data to produce binary image data and means for discriminating whether the input image data represents a gray level image on the basis of the binary data output from said binarizing means,
    wherein said discrimination means further comprises a first discriminating circuit for performing a predetermined operation on the binary data output from said binarizing means and discriminating a content of the image in accordance with the operation result, and a second discriminating circuit for discriminating a content of the image, in a different operation from that of said first discriminating circuit, to correct a discrimination result provided by said first discriminating circuit, by comparing the binary data output from said binarizing means with a predetermined pattern having specific periodicity, and wherein said discrimination means conclusively discriminates a content of the image data by using results of discrimination performed by said first and second discriminating circuits, and wherein said input means and said processing means operate in parallel on different respective image data.

2. An image processing apparatus according to claim 1, wherein said discrimination means divides the binary data into blocks and discriminates the image content block by block, each block comprising a plurality of binary data.

3. An image processing apparatus according to claim 1, wherein said binarizing means includes gray level processing means for gray level processing the input image data to produce gray level processed binary data, and non-gray level processing means for non-gray level processing the input image data to produce non-gray level processed binary data, and wherein said discrimination means selects the gray level processed binary data or the non-gray level processed binary data.

4. An image processing apparatus according to claim 3, wherein said first discrimination circuit includes count means for counting the binary data outputted from said non-gray level processing means and discriminates the image content in accordance with the count of said count means.

5. An image processing apparatus according to claim 4, wherein said discrimination means divides said binary data into blocks and discriminates the image content block by block, each block comprising a plurality of binary data, and wherein said first discrimination circuit discriminates that the block is a gray level image area when the binary data in the block all have the value 0 or all have the value 1.

6. An image processing apparatus according to claim 3, wherein said second discrimination circuit compares the binary data outputted from said gray level processing means with a predetermined pattern and discriminates a content of the image in accordance with the comparison result.

7. An image processing apparatus according to claim 6, wherein said second discrimination circuit includes a counter for comparing the binary data outputted from said gray level processing means with said predetermined pattern and counting the number of occurrences of the coincidence in comparison, and discriminates whether the image is a halftone image or not in accordance with the count result by said counter.

8. An image processing apparatus according to claim 3, wherein said non-gray level processing means binarizes the input image data using one fixed threshold.

9. An image processing apparatus according to claim 8, wherein said gray level processing means dither processes the input image data using a predetermined threshold matrix to produce binary data.

10. An image processing apparatus according to claim 1, wherein said second discrimination circuit discriminates whether the image is halftone image or not, and said discrimination means conclusively discriminates that the image is a halftone image regardless of the discrimination result by said first discrimination circuit when said second discrimination circuit discriminates that the image is a halftone image.

11. An image processing apparatus comprising:
memory means for storing binary data;
discrimination means for discriminating whether or not the binary data represents a gray level image, said discriminating means using a plurality of discrimination methods on the basis of the binary data stored in said memory means to make said discrimination; and
output means for outputting the binary data stored in said memory means as data for image reproduction in accordance with a discrimination result provided by said discriminating means,
wherein, in one of said plurality of discrimination methods, said discrimination means judges whether or not the binary data represents a gray level image by comparing the binary data with a predetermined pattern having specific periodicity.

12. An apparatus according to claim 11, wherein the binary data is binarized in plural modes and the plural modes are different in resolution from each other.

13. An apparatus according to claim 12, wherein the plural modes include a first mode of binarization using a fixed threshold and a second mode of binarization using dither thresholds.

14. An image processing apparatus according to claim 11, wherein said discrimination means divides the binary data into blocks and discriminates image content block by block.

15. An image processing apparatus according to claim 14, wherein said discrimination means identifies a block as a gray level image area if the binary data in the block are all "0" or are all "1".

16. An apparatus according to claim 11, wherein said discrimination means further comprises count means for counting the number of the binary data stored in said memory means having the value 1, and discriminates whether or not the binary data represents a gray level image on the basis of the count counted by said count means.

17. An image processing apparatus to claim 11, further comprising correction means for correcting the discrimination result provided by said discrimination means, by using said one discrimination method.

18. An image processing apparatus according to claim 3, wherein said correction means judges whether or not the binary data represents a gray level image by comparing the binary data with a predetermined pattern, and corrects the discrimination result on the basis of such judgment.

19. An image processing apparatus, comprising:
memory means for storing binary image data;
discrimination means for discriminating, on the basis of the binary data stored in said memory means, whether or not the binary image data represents a gray level image;
correction means for correcting a discrimination result provided by said discrimination means; and
output means for outputting the binary image data stored in said memory means as data for image reproduction in accordance with a corrected discrimination result provided by said correction means, wherein said correction means judges whether or not the binary image data represents a gray level image by comparing the binary image data with a predetermined pattern having specific periodicity, and corrects the discrimination result on the basis of such judgment.

20. An image processing apparatus according to claim 19, wherein said discrimination means divides the binary data into blocks and discriminates the image content block by block.

21. An image processing apparatus according to claim 20, wherein said discrimination means identifies a block as a gray level image area if the binary data in the block are all "0" or are all "1".

22. An image processing apparatus according to claim 19, wherein said discrimination means further comprises count means for counting the number of the binary data stored in said memory means having the value 1, and discriminates whether or not the binary data represents a gray level image on the basis of the count counted by said count means.

23. An image processing apparatus according to claim 19, wherein said memory means stores binary image data binarized in a plurality of modes different in resolution from each other.

24. An image processing apparatus comprising:
input means for successively inputting image data;
binarization means for binarizing image data input by said input means;
discrimination means for discriminating whether or not the image data represents a gray level image on the basis of the image data binarized by said binarization means; and
correction means for correcting a discrimination result provided by said discrimination means by comparing the image data with a predetermined pattern having specific periodicity,
wherein said input means, binarization means and discrimination means operate in parallel on different respective image data.

25. An image processing apparatus according to claim 24, wherein said input means comprises a CCD sensor.

26. An image processing apparatus according to claim 24, wherein said binarization means performs binarization using a predetermined threshold.

27. An image processing apparatus according to claim 24, wherein said discrimination means divides the binary data into blocks and discriminates the image content block by block.

28. An image processing apparatus according to claim 27, wherein said discrimination means identifies a block as a gray level image area if the binary data in the block are all "0" or are all "1".

29. An image processing apparatus according to claim 24, wherein said discrimination means further comprises count means for counting the number of the binary data stored in said memory means having the value 1, and discriminates whether or not the binary data represents a gray level image on the basis of the count counted by said count means.

30. An image processing method comprising the steps of:
an image data input step of successively inputting image data; and
a processing step of processing image data input in said input step,
said processing step further comprising the step of binarizing the input image data to produce binary image data and the step of discriminating whether the input image data represents a gray level image on the basis of the binary data produced in said binarizing step,
wherein said discrimination step further comprises a first discriminating step of performing a predetermined operation on the binary data output in said binarizing step and discriminating a content of the image in accordance with the operation result, and a second discriminating step of discriminating a content of the image, in a different operation from that of said first discriminating step, to correct a discrimination result provided in said first discriminating step, by comparing the binary data output in said binarizing step with a predetermined pattern having specific periodicity, and wherein, in said discrimination step, a content of the image data is conclusively discriminated by using results of discrimination performed in said first and second discriminating steps, and
wherein said input step and said processing step are performed in parallel on different respective image data.

31. An image processing method comprising the steps of:
storing binary data in a memory;
discriminating whether or not the binary data represents a gray level image, by using a plurality of discrimination methods on the basis of the binary data stored in said memory; and
outputting the binary data stored in said memory as data for image reproduction in accordance with a discrimination result obtained said discriminating step,
wherein one of said plurality of discrimination methods includes the step of judging whether or not the binary data represents a gray level image, by comparing the binary data with a predetermined pattern having specific periodicity.

32. An image processing method comprising the steps of:
storing binary image data in a memory;
discriminating, on the basis of the binary image data stored in said memory, whether or not the binary image data represents a gray level image;
correcting a discrimination result obtained in said discriminating step; and
outputting the binary image data stored in said memory as data for image reproduction in accordance with a corrected discrimination result obtained in said correcting step,
wherein said correcting step comprises the step of judging whether or not the binary image data represents a gray level image by comparing the binary image data with a predetermined pattern having specific periodicity and the step of correcting the discrimination result on the basis of such judgment.

33. An image processing method comprising the steps of:
successively inputting image data;
binarizing image data input in said inputting step;
discriminating whether or not the image data represents a gray level image on the basis of the binary image data produced in said binarizing step; and
correcting a discrimination result provided in said discriminating step by comparing the image data with a predetermined pattern having specific periodicity,
wherein said inputting step, binarizing step and discriminating step are performed in parallel on different respective image data.

* * * * *

UNITED STATES PATENT AND TRADEMARK OFFICE
CERTIFICATE OF CORRECTION

PATENT NO. : 5,267,330
DATED : November 30, 1993
INVENTOR(S) : YUKIO MASUDA

Page 1 of 3

It is certified that error appears in the above-indentified patent and that said Letters Patent is hereby corrected as shown below:

ON TITLE PAGE

AT [57] ABSTRACT, Line 8, "count" should read --the count--.

IN THE DRAWINGS

SHEET 8 OF 12

FIG. 15, "MISS" should read --MIS- --.

COLUMN 2

Line 18, "appears" should read --appears.--.
Line 45, "affect" should read --effect--.

COLUMN 3

Line 4, "diether" should read --dither--.
Line 6, "shows," should read --shows--.

COLUMN 4

Line 3, "memories 11-18" should read --memories 11-14, 17 and 18--.
Line 59, "identi-" should read --(identi- --.
Line 60, "fied" should read --fied)--.

UNITED STATES PATENT AND TRADEMARK OFFICE
CERTIFICATE OF CORRECTION

PATENT NO. : 5,267,330
DATED : November 30, 1993
INVENTOR(S) : YUKIO MASUDA

It is certified that error appears in the above-indentified patent and that said Letters Patent is hereby corrected as shown below:

COLUMN 5

Line 57, "the counts" should read --counts--.
Line 58, "discrimination" should read --the discrimination--.
Line 59, "the" should be deleted.

COLUMN 6

Line 23, "discriminated discriminated." should read --discriminated.--.

COLUMN 7

Line 49, "computer" should read --comparator--.
Line 50, "allowable value" should read --allowable-value--.

COLUMN 8

Line 12, "anticoincidence" should read --anticoincidences-- and "a" should be deleted.
Line 13, "allowable" should read --allowable- --.

COLUMN 9

Line 17, "block" (third occurrence) should read --block.--.

UNITED STATES PATENT AND TRADEMARK OFFICE
CERTIFICATE OF CORRECTION

PATENT NO. : 5,267,330
DATED : November 30, 1993
INVENTOR(S) : YUKIO MASUDA

It is certified that error appears in the above-indentified patent and that said Letters Patent is hereby corrected as shown below:

<u>COLUMN 12</u>

Line 46, "apparatus" should read --apparatus according--.
   Line 51, "claim 3," should read --claim 27,--.

Signed and Sealed this

Twelfth Day of July, 1994

Attest:

BRUCE LEHMAN

Attesting Officer     Commissioner of Patents and Trademarks